(12) United States Patent
Parlour et al.

(10) Patent No.: US 6,904,527 B1
(45) Date of Patent: Jun. 7, 2005

(54) INTELLECTUAL PROPERTY PROTECTION IN A PROGRAMMABLE LOGIC DEVICE

(75) Inventors: David B. Parlour, Pittsburg, PA (US); Richard S. Ballantyne, Stittsville (CA)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/524,971

(22) Filed: Mar. 14, 2000

(51) Int. Cl.$^7$ ............................................... H04L 9/32
(52) U.S. Cl. ..................................... 713/189; 713/100
(58) Field of Search ......................................... 713/189

(56) References Cited

U.S. PATENT DOCUMENTS

| | | | |
|---|---|---|---|
| 4,731,843 A | | 3/1988 | Holmquist ..................... 380/29 |
| 5,058,162 A | * | 10/1991 | Santon et al. .................. 705/51 |
| 5,530,753 A | * | 6/1996 | Easter et al. ................. 713/191 |
| 5,671,284 A | | 9/1997 | Buer ............................. 380/29 |
| 5,703,950 A | * | 12/1997 | Jovanovich et al. ........ 380/249 |
| 5,774,544 A | * | 6/1998 | Lee et al. .................... 713/189 |
| 5,835,599 A | | 11/1998 | Buer ............................. 380/29 |
| 5,970,142 A | | 10/1999 | Erickson ....................... 380/21 |
| 5,978,476 A | | 11/1999 | Redman et al. ................ 380/4 |
| 5,982,899 A | * | 11/1999 | Probst ............................ 713/1 |
| 6,212,639 B1 | * | 4/2001 | Erickson et al. ............ 713/200 |
| 6,305,005 B1 | * | 10/2001 | Burnham ...................... 716/16 |

OTHER PUBLICATIONS

Microsoft Computer Dictionary, 2002, Microsoft Press, 5$^{th}$ edition, p. 123.*

"The Programmable Logic Data Book", (1999) available from Xilinx, Inc., 2100 Logic Drive, San Jose, California 95124, pp. 2–1 to 2–11 and 3–3 to 3–22.
Web page for GLOBEtrotter: "Articles—How License Managers Work", www.globetrotter.com/art2.htm; 2 pages printed Jan. 20, 2000.
Web page for GLOBEtrotter: "Company Info—GLOBEtrotter Announces two Major Patents in Electronic Commerce for Software"; www.globetrotter.com/patents.htm; 2 pages printed Jan. 20, 2000.
Web page for GLOBEtrotter: "Articles—Some Encryption Issues"; www.globetrotter.com/art3.htm; 2 pages printed Jan. 20, 2000.

(Continued)

*Primary Examiner*—Gregory Morse
*Assistant Examiner*—Jacob Lipman
(74) *Attorney, Agent, or Firm*—T. Lester Wallace; Edel M. Young; Justin Liu (57) ABSTRACT

Individual IP vendors can directly license their IP modules to PLD users. Each PLD has a unique device identifier (UDI). If a user obtains a license to use an IP module on a particular PLD, then the IP vendor issues the user an authorization code (AC). The user supplies the AC to a license manager. The license manager decrypts the AC and checks that the UDI of the supplied AC matches the UDI of the PLD. If the two match, then the license manager encrypts a key, and sends the encrypted key to the PLD. The PLD uses a private key to decrypt the key. When the configuration bitstream for the design is later sent to the PLD, the license manager encrypts the IP module portion of the bitstream with the key. The PLD receives the bitstream and uses the decrypted key to decrypt the IP module portion.

27 Claims, 5 Drawing Sheets

OTHER PUBLICATIONS

Web page for GLOBEtrotter: "Articles—License Management: How developers control software licensing"; www.globetrotter.com/art1.htm; 5 pages printed Jan. 20, 2000.

Web page for GLOBEtrotter—Product Line Overview:" About GLOBEtrotter Software"; www.globetrotter.com/overview.shtml; 7 pages printed Jan. 20, 2000.

Web page for GLOBEtrotter:"Articles—Conceptual description of a generic license manager"; www.globetrotter.com/ms_lm.htm; 3 pages printed Jan. 20, 2000.

Bruce Schneier, "Applied Cryptography", Second Edition, Chapter 12: Data Encryption Standard (DES), pp. 265–301 (1996).

Web page for Sheriff—Software Copy Protection; www.sheriff-software.com/overview.htm; 3 pages printed Jan. 20, 2000.

Web page for GLOBEtrotter: Third–Generation License Management; "GLOBEtrotter Software Rolls Out Third–Generation License Management"; www.globetrotter.com/pr941004.htm; 2 pages printed Jan. 20, 2000.

* cited by examiner

INTELLECTUAL PROPERTY PROTECTION IN A PROGRAMMABLE LOGIC DEVICE

TECHNICAL FIELD

This invention relates to a method and apparatus for securing configuration data used to configure a programmable logic device.

BACKGROUND INFORMATION

The term Programmable Logic Device (PLD) designates a class of devices that are programmable by end users to realize user-specific circuits. Examples of PLDs are FPGAs (Field Programmable Gate Arrays) and EPLDs (Erasable Programmable Logic Devices). To use a PLD, a user captures a circuit design using any of several capture/design tools. The user then uses the capture/design tool to convert the captured design into device-specific configuration data. The configuration data is commonly stored in an external storage device, such as an EPROM. Upon startup, the storage device supplies the configuration data to the PLD, thereby configuring the PLD to realize the user-specific circuit. Since the configuration data is often supplied in serial fashion, the configuration data is called a "bitstream". The PLD, having read in the configuration data bitstream, is then configured to realize the user-specific circuit.

Figure 1:
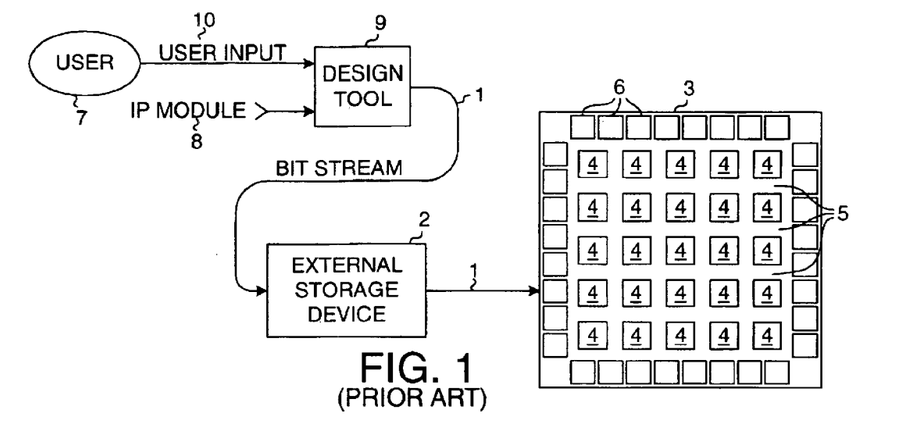
FIG. 1 (Prior Art) is a block diagram illustrating conventional loading of a configuration bitstream into a programmable logic device (PLD).

FIG. 1 (Prior Art) illustrates the loading of such a configuration data bitstream 1 from an external storage device 2 into a PLD 3 to realize a user-specific circuit. PLD 3 in this case is an FPGA (for example, a XC4000 series FPGA available from Xilinx, Inc. of San Jose, Calif.). PLD 3 includes a plurality of configurable logic blocks (called CLBS) 4, and a programmable interconnect structure 5, surrounded by a ring of configurable input/output blocks (called IOBs) 6. Each of the CLBs, the programmable interconnect structure, and the IOBS includes configuration memory cells, the contents of which determine how the CLBs, the programmable interconnect structure, and the IOBs are configured. Particular bits in bitstream 1 correspond to the contents of particular configuration memory cells. If, for example, two pieces of interconnect in the programmable interconnect structure controlled by a particular memory cell are to be connected in the user-specific circuit, then the particular bit in the bitstream corresponding to the memory cell for the particular programmable connection is set accordingly. Upon power-up of the FPGA, the bitstream 1 is transferred from external storage device 2 into PLD 3 to configure PLD 3 to be the user-specific circuit. In some prior art FPGA architectures, the protocol of the configuration data bitstream (including knowledge of which bits correspond to which configuration memory cells) is proprietary to the FPGA manufacturer, thereby providing individual users a level of security for their designs. Without knowledge of the protocol and the significance of the individual bits of the bitstream, another user cannot readily regenerate the actual circuit by inspection of the bitstream.

Over recent years, such user-specific circuits have typically increased in size and complexity. Simultaneously, market forces have reduced the amount of time practically available for developing such large user-specific circuits. In this environment, users have increasingly found it cost-effective to purchase from IP vendors (intellectual property vendors) pre-designed building blocks for use in the users' designs. Such a building block, sometimes called an "IP module" (intellectual property module), may have taken the IP vendor several engineer-years to design. An example of such an IP module is a PCI bus interface module. Rather than taking the time to design a circuit to perform the PCI interface function carried out by the IP module, the user 7 purchases the IP module 8 (in digital form) from the IP vendor. User 7 loads the IP module 8 into a capture/design tool 9 used to capture the user-specific design. User 7 then adds other user-specific circuitry 10 around the IP module using the capture/design tool 9, thereby designing the overall user-specific circuit. Once the overall user-specific circuit is designed, simulated, placed and routed, (steps in converting the user's design to device-specific configuration data) the capture/design tool 9 outputs the bitstream 1 for the overall user-specific circuit. As illustrated in FIG. 1, this bitstream 1 is then loaded into the external storage device 2 (for example, a PROM) so that the external storage device 2 will be able to supply the bitstream 1 to the FPGA on power-up.

A problem, however, exists in that the user's user-specific design can be copied. An unscrupulous second user could obtain a product of a first user on the market and copy the bitstream 1 that passes from the external storage device 2 to FPGA 3 on power-up. The second user could then use the copied bitstream to configure another FPGA (the same type of FPGA used by the first user), thereby replicating the first user's user-specific design and product. Protection against this copying of one user's design by another user is desired.

Erickson in U.S. Pat. No. 5,970,142 discloses one method wherein the bitstream transferred from the external storage device is in encrypted form and the PLD being configured has a key to decrypt the encrypted bitstream. The PLD receives the encrypted bitstream and uses its key to generate the unencrypted bitstream which is then loaded into the configuration memory cells to configure the PLD. Because in this method the key is not passed from the external storage device to the PLD, a copier would not have access to the key. Without the key, the copier would have a difficult time recovering the bitstream. Other methods are also known.

Not only is one user's copying of another user's design a problem, but the unauthorized reincorporation of a vendor-supplied IP module into other user designs is also a problem. Redman et al. in U.S. Pat. No. 5,978,476, as the present inventors understand it, discloses a design processing system that attempts to verify the identity of the user before allowing the user to use a vendor-supplied IP module. The design processing system that generates a programming file of bitstream information contains the IP module in an encrypted form as well as a permission verification system. The vendor to the IP module supplies an authorization code to a particular user where the authorization code is specific to the computer of the user (or is specific to a "dongle" supplied to the user). When an attempt is later made to use an IP module in the design processing system, the permission verification system requires the user to supply the authorization code. The permission verification system reads the computer's identification number (or the "dongle" number of a dongle attached to the computer) and checks this number with the supplied authorization code. If the number read from the computer is not appropriate for the authorization number provided by the user, then the user-verification process fails and the permission verification system does not allow the IP module to be decrypted. Aspects of the IP module are not revealed to the user. Moreover, the design processing system will not include configuration data for the IP module in the output programming file.

If, on the other hand, the number read from the computer is appropriate for the authorization code provided by the user, then the permission verification system allows the encrypted IP module to be decrypted and used by the design processing system. The user uses the design processing system to incorporate the IP module into the user-specific circuit designed by the user. When design of the user-specific circuit is completed, the design processing system outputs configuration data for the user-specific circuit in a programming file. The programming file of configuration data is then usable to program a PLD to realize the user-specific circuit. In this scheme, however, the configuration data so generated is output from the design processing system in unencrypted form. An authorized but nonetheless unscrupulous user could copy the programming file of bitstream information or a portion thereof and reuse it in an unauthorized fashion outside the control of the design processing system.

An improved system and method for protecting PLD designs is desired wherein a user is prevented from using an IP module in an unauthorized manner, and wherein one user is prevented from copying the user-specific circuit of another user.

SUMMARY

A user arranges with an IP vendor to use a particular IP module. If the arrangement is suitable to the IP vendor, then the IP vendor issues the user an authorization code. This authorization code contains: 1) a usage condition, 2) an indication of the IP module authorized, 3) an "IP module key" for the IP module, and 4) a value (for example, a serial number or ID number or dongle number) that identifies the user's development system. There are numerous different usage conditions. Possible usage conditions include: usage is authorized for an unlimited number of uses, usage is authorized for an unlimited number of uses during a particular time period, usage is authorized for a limited number of uses, usage is authorized only for a particular development system (node-locked license), usage is authorized on a particular individual PLD.

In an embodiment where authorization is granted for use on a particular PLD, the authorization code also contains the unique device identifier (UDI) of the target PLD to be programmed. For some types of PLD, each PLD is manufactured with its own unique, non-volatile, non-rewritable UDI that uniquely identifies that particular PLD. The user uses the development system to read the UDI out of the target PLD. The user then supplies the UDI to the IP vendor. The IP vendor uses authorization code generating software to generate an authorization code that includes that UDI. The authorization code is therefore, in this embodiment, specific to the particular target PLD.

A public key/private key encryption scheme is used to encrypt the authorization code such that the user cannot decipher the information contained within it. The IP vendor's authorization code generating software uses the UDI (as a public key) as well as another key (a private key) to encrypt the authorization code. The private key is known both to the IP vendor's authorization code generating software as well as to the user's development system, but the private key (unlike the UDI) is not communicated to the authorization code generating software. The private key is not known to the user. The user and the IP vendor therefore have no access to the private key.

After receiving the authorization code, a part of the development system called the license manager "verifies" that the user is authorized to use the particular IP module. If, for example, the usage condition indicated by the authorization code indicates use is authorized during a certain time period, then the license manager consults a clock maintained by the license manager. If the current time as read from the clock is within the authorized time period, then the license manager verifies usage of the IP module. Alternatively, if the usage condition indicates use is authorized for a given number of usages, then the license manager consults a usage meter maintained by the license manager. If the usage meter indicates that the authorized number of uses has not been exceeded, then the license manager increments the usage meter and verifies usage of the IP module. Alternatively, if the usage condition indicates use is authorized on one or more particular PLDs, then the license manager reads the UDI out of the target PLD, decrypts the UDI portion of the authorization code, and verifies that the decrypted UDI matches the UDI read from the PLD. If the decrypted UDI matches the UDI read from the PLD, then the license manager verifies usage of the IP module on the target PLD.

If the verification is made, then the license manager uses the UDI (as a public key) along with the private key to encrypt the "IP module key" from the authorization code. Once encrypted, the license manager sends the encrypted IP module key to the target PLD. The target PLD receives the encrypted IP module key and decrypts it using two keys stored on the target PLD: 1) the UDI (public key), and 2) the private key. The private key, unlike the UDI, cannot be read out of the PLD. The resulting decrypted IP module key is then stored in non-volatile memory on the PLD in association with a key number. The target PLD can use the key number to look up the key at a later time. If, however, the verification is not made, then the encrypted key is not sent to the target PLD.

When the user has completed the design of the user-specific circuit that incorporates the IP module, a configuration data bitstream is to be generated so that it can be sent to the target PLD to configure the target PLD. A capture/design tool in the development system outputs this configuration bitstream, but before it is sent to the target PLD, the license manager encrypts the IP module portion of the bitstream using the IP module key. The license manager also inserts into the bitstream the key number of the IP module key in such a way that the key number is associated in the bitstream with the encrypted IP module portion.

The target PLD receives the bitstream including the key number and the encrypted IP module portion. The target PLD uses the key number to retrieve the proper IP module key from its non-volatile memory, and then uses the retrieved IP module key to decrypt the IP module portion. When the IP module portion has been decrypted, the resulting configuration data bitstream is used to configure the target PLD so as to realize the user-specific circuit.

Using this approach, individual IP vendors can directly license their IP modules to PLD users without involvement of the PLD manufacturer. Numerous IP modules can be used in a single user-specific design, the user having received a different authorization code for the use of each IP module. Because the IP module keys used to decrypt the IP module portions of the bitstream are themselves encrypted in a way specific to the particular target PLD (due to use of the UDI), IP vendors can license use of their IP modules for particular PLDs or for a given number of uses ("use-based licensing"). IP vendors can also license their IP modules for a time period or up until a particular expiration date ("time-based licensing").

Not only are IP module keys for IP modules encrypted and sent to the target PLD, but a "user key" for the portion of the user-specific design contributed by the user is also encrypted and sent to the target PLD. No authorization code is required for the encryption of the user key and the passing of this user key to the PLD. The use of this user key to decrypt the appropriate portion of the bitstream occurs as described above in connection with the IP module keys. In this way, the user-specific design of a first user is protected from copying by a second user because the portion of the user-specific circuit designed by the first user is encrypted with a user key not known to the second user. The IP modules of the IP vendors are secure from copying by a user because the IP module portions of the bitstream are encrypted with IP module keys not known to the user.

Individual IP vendors can directly license their IP modules to PLD users under their own chosen conditions. Individual IP vendors can use time-based licenses or use-based licenses. Each PLD is manufactured with a non-volatile non-rewritable unique device identifier (UDI) that uniquely identifies the PLD. If, for example, a user obtains a license to use a particular IP module on a particular PLD, then the IP vendor issues the user an authorization code that contains the UDI (in encrypted form) of the authorized target PLD. When the user wishes to use the IP module, the user supplies the authorization code to a license manager. The license manager decrypts the authorization code and checks that the UDI of the supplied authorization code matches the UDI of the to-be-programmed PLD. If the two match, then the license manager encrypts a key for the IP module using the UDI and a private key, and then sends the encrypted key to the target PLD. The target PLD uses its UDI and the private key to decrypt the key. The key is then stored in on the PLD. When the configuration bitstream for the design that incorporates the IP module is later sent to the PLD, the license manager encrypts the IP module portion with the key. The PLD receives the bitstream and uses the stored key to decrypt the IP module portion of the bitstream. The unencrypted bitstream is then used to configure the PLD.

Other structures and methods are disclosed in the detailed description below. This summary does not purport to define the invention. The invention is defined by the claims.

DETAILED DESCRIPTION

Figure 2:
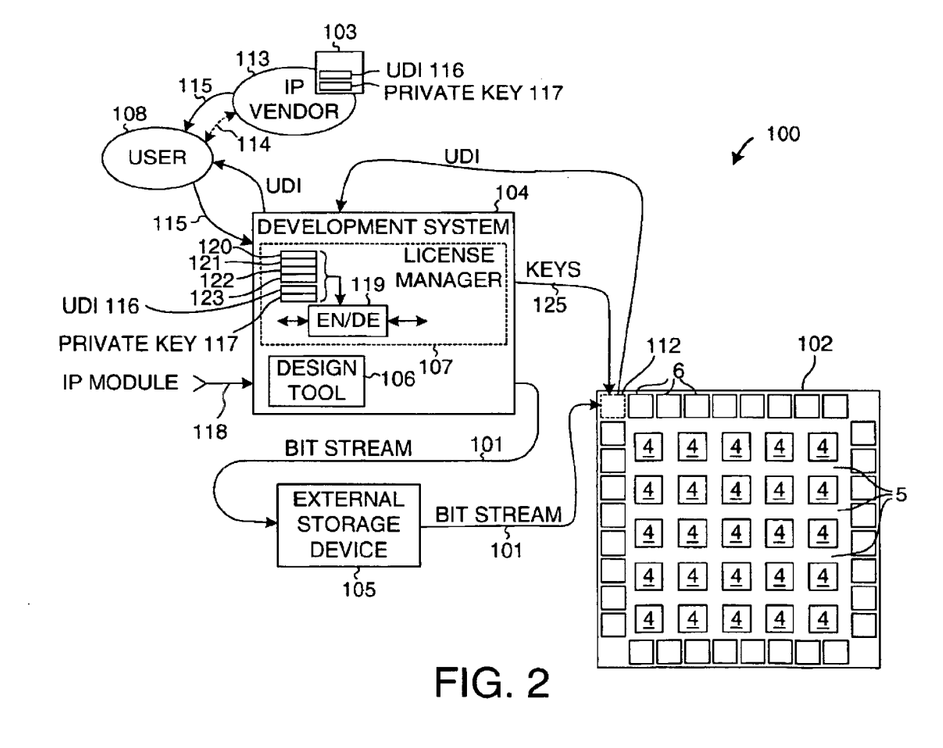
FIG. 2 is a block diagram of a system wherein a configuration bitstream is loaded into a programmable logic device (PLD) in accordance with an embodiment of the present invention.

FIG. 2 is a simplified diagram illustrating a system 100 that carries out a method in accordance with an embodiment of the present invention. A configuration bitstream 101 for a user-specific circuit is loaded into a target FPGA integrated circuit 102 in such a way that vendor-supplied IP module design information in the bitstream 101 is protected from unauthorized use. System 100 includes authorization code generating software 103, a development system 104, an external storage device 105, and target FPGA 102. The development system 104 typically involves software executing on a personal computer or a workstation and includes a capture/design tool 106 and a license manager 107. A user 108 uses the capture/design tool 106 to design the user-specific circuit, to simulate it, to map, place and route it on FPGA 102, and to generate the configuration bitstream 101 for configuring FPGA 102. For additional information on an exemplary development system, see: pages 2–1 through 2–11 of "The Programmable Logic Data Book 1999", copyright 1999 by Xilinx, Inc. (the content of which is incorporated herein by reference).

FPGA 102 includes a two-dimensional array of configurable logic blocks (CLBS) 4 and a programmable interconnect structure 5 surrounded by a ring of programmable input/output blocks (IOBs) 6. An intellectual property protection circuit (IPPC) 112 is included in a corner of the FPGA 102. FPGA 102 may, for example, be a Virtex family FPGA available from Xilinx, Inc. of 2100 Logic Drive, San Jose, Calif. 95124. For additional information on a Virtex family FPGA, including information on the structure and operation of a CLB, an 10B and a programmable interconnect structure, see: pages 3–3 through 3–22 of "The Programmable Logic Data Book 1999", copyright 1999 by Xilinx, Inc. (the content of which is incorporated herein by reference).

Figure 3:
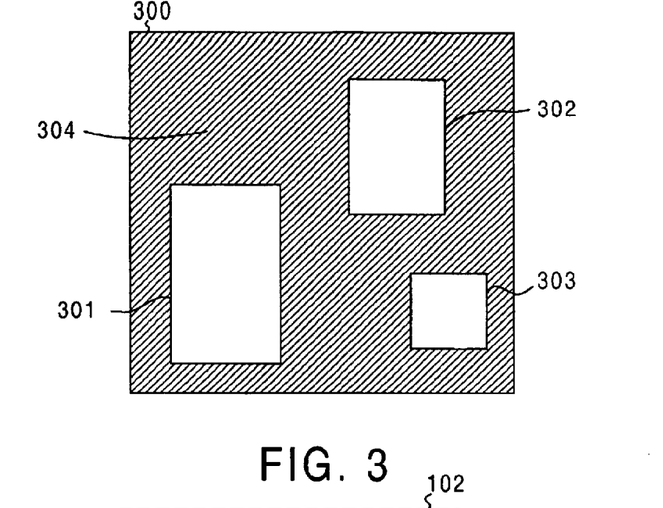
FIG. 3 is a simplified top-down diagram of a central part of the PLD of FIG. 2 configured to involve three IP modules.

FIG. 3 is a simplified top-down diagram of the user-specific circuit as it is realized in the configured FPGA 102. The square 300 of FIG. 3 represents the central CLB and programmable interconnect area 4 and 5 of FPGA 102. The user-specific circuit includes three IP modules 301–303. In this example, a different piece of IP module design information is used to realize each of these modules and each piece is provided by a different IP vendor. User 108 (see FIG. 2) has incorporated these IP modules 301–303 into the overall user-specific circuit by providing additional circuitry 304. User 108 designs this additional circuitry 304 using capture/design tool 106. In the illustrated example, the circuitry of each of the three modules 301–303 is placed and routed in its own separate area of FPGA 102.

Figures 4, 4B:
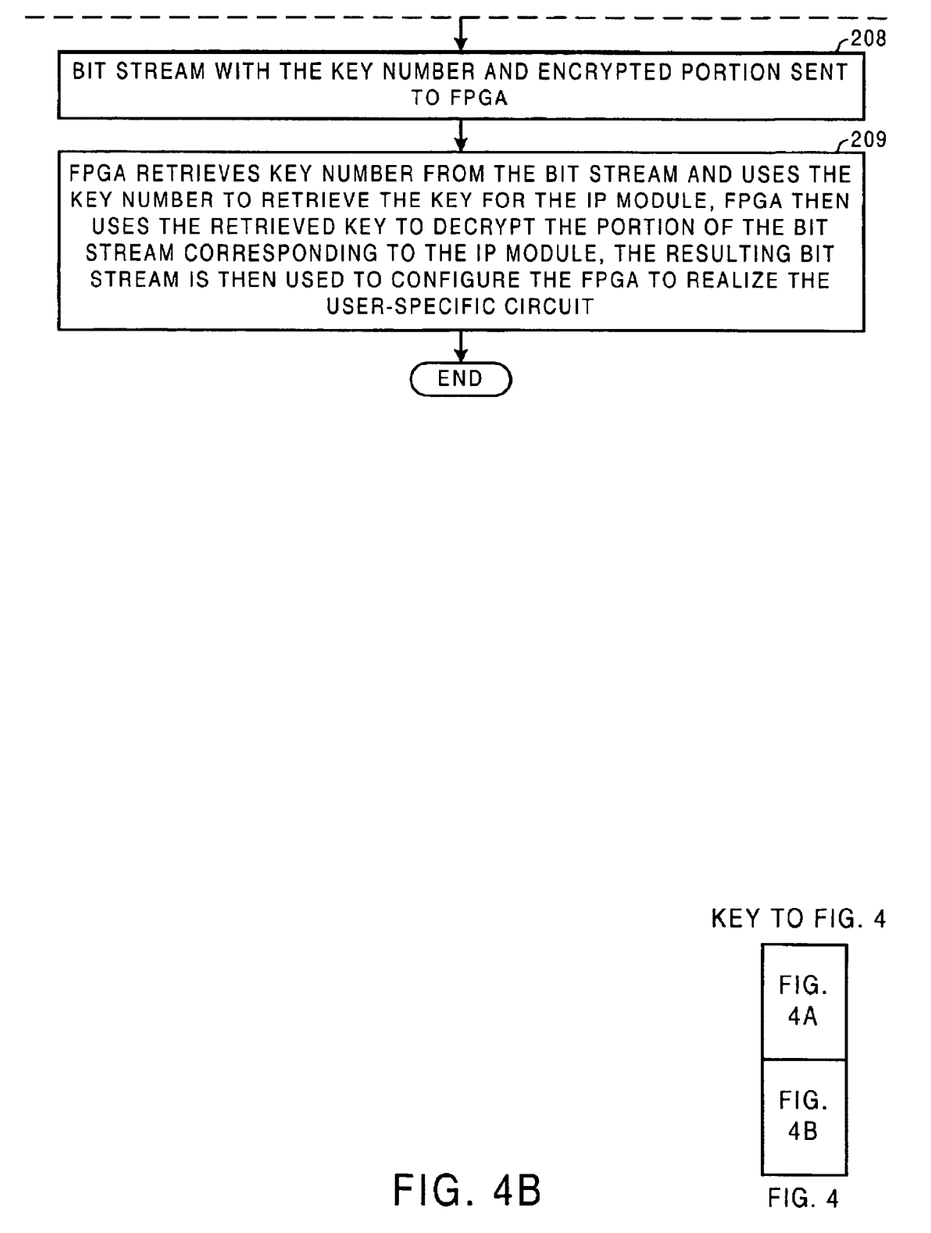
FIGS. 4A and 4B are a simplified flow-chart of a method carried out by the system 100 of FIG. 2.

FIG. 4 (comprising FIGS. 4A and 4B) is a flowchart of a method carried out by the system 100 of FIG. 2. Generally, the user 108 seeks to incorporate an IP module (for example, IP module 301) of an IP vendor (for example, IP vendor 113) into the user's user-specific circuit. The user 108 communicates 114 with the IP vendor 113 and if a license arrangement satisfactory to IP vendor 113 is made, then IP vendor 113 supplies the user 108 with an authorization code 115 to use the IP module. The authorization code includes: 1) a usage condition, 2) an indication of the particular IP module authorized, 3) an "IP module key" for the IP module, and 4) a value (for example, a serial number or ID number or dongle number) that identifies the user's development system. There are numerous different usage conditions that can be specified. Possible usage conditions include: usage is authorized for an unlimited number of uses, usage is authorized for an unlimited number of uses during a particular time period, usage is authorized for a limited number of uses, usage is authorized on particular individual PLDs.

Figure 4A:
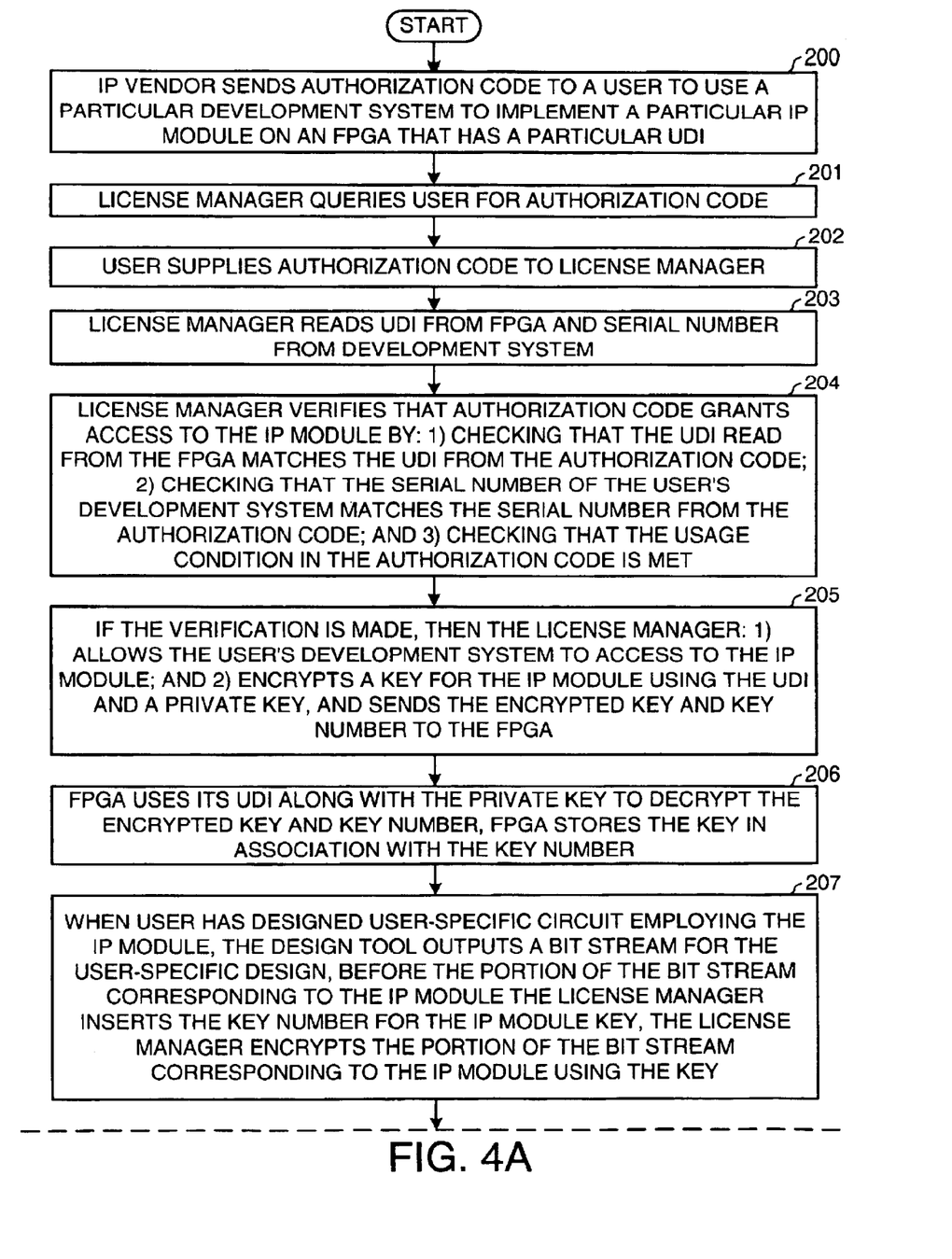

In the method of FIG. 4, the authorization code 115 grants authorization to use one particular development system to one specified IP module on one particular target PLD only. In such a case where the authorization code grants authorization for one particular PLD, the authorization code also contains a unique device identifier (UDI) 116 of the target PLD to be programmed. Each FPGA carries its own unique UDI that is programmed into it by the FPGA manufacturer. Once a UDI is written into a FPGA at the end of FPGA manufacturing, the UDI cannot be rewritten. A UDI therefore uniquely identifies a particular FPGA.

Figure 5:
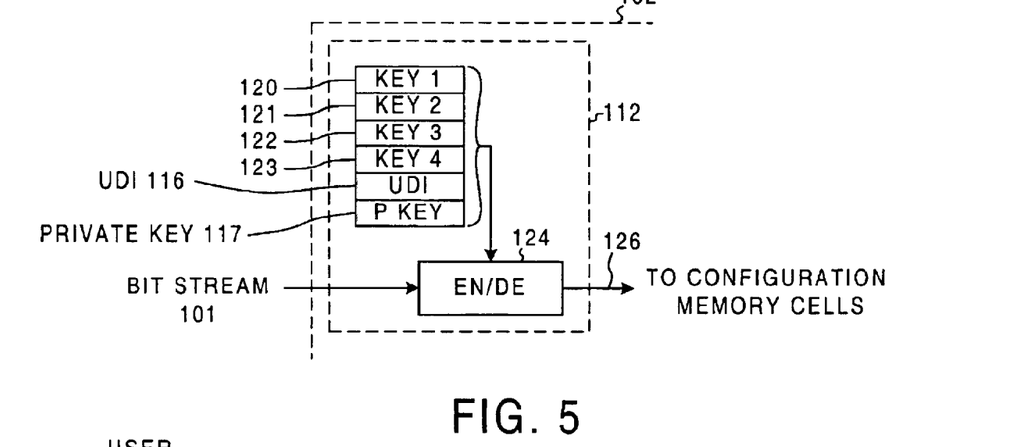
FIG. 5 is a simplified diagram illustrating the intellectual property protection circuit 112 of the PLD of FIG. 2.

FIG. 5 illustrates the UDI 116 stored in a write-once, non-volatile, read-only-memory (ROM) location in intellectual property protection circuit 112. This non-volatile UDI storage can be implemented in any technology that can be added to the FPGA. The non-volatile UDI storage can, for example, be implemented using an antifuse-based register, a fuse-based register, a laser-programmed register, an EPROM register, and/or a flash-based register.

IP vendor 113 queries user 108 for the UDI 116 of the target FPGA 102. In one embodiment, the user 108 uses the development system 104 to read the UDI from the target FPGA 102. In this embodiment, development system 104 includes associated interface hardware (not shown) and this interface hardware reads the UDI 116 out of FPGA 102. The interface hardware is provided with the development system so that the development system 104 can read from and/or write to FPGA 102. The user may, however, obtain the UDI 116 by means other than such interface hardware. The UDI may, for example, simply be printed on the FPGA 102.

When the IP vendor 113 receives UDI 116, the IP vendor 113 uses authorization code software 103 to generate the authorization code 115 such that the information contained in the authorization code is encrypted using a public key/private key scheme. The public key used is UDI 116 received from user 108. The private key used is a private key 117 known to the authorization code generating software 103, to the license manager 107, and to PLD 102. The private key 117, unlike UDI 116, does not pass through user 108 and is therefore not known to user 108. The private key 117 cannot be read out of the authorization code generating software 103, out of the development system 104, or out of PLD 102.

Once the authorization code 115 is generated, IP vendor 113 sends (FIG. 4, step 200) the authorization code 115 to the user 108. When user 108 attempts to use IP module design information 118 (in this example, IP module design information 118 is design information for realizing IP module 301), the license manager 107 queries (step 201) user 108 for authorization code 115. User 108 responds (step 202) by supplying the authorization code 115 to the license manager 107. The license manager 107 uses the UDI 116 (the public key) and the private key 117 to decrypt the authorization code 115 so as to recover: 1) the usage condition, 2) the indication of the IP module authorized, 3) the "IP module key", and 4) the serial number or ID number or dongle number of the user's development system.

Next, license manager 107 reads (step 203) the UDI 116 from the FPGA 102 and reads the serial number or ID number or dongle number of the development system 104. The license manager 107 then verifies (step 204) that the authorization code 115 supplied by user 108 in fact grants access to the IP module design information 118. The license manager 107 does this by: 1) checking that the UDI 116 read from FPGA 102 matches the UDI from the authorization code 115, 2) checking that the serial number or ID number or dongle number read from the user's development system 104 matches the serial number or ID number or dongle number from authorization code 115, and 3) checking that the usage condition of authorization code 115 is satisfied.

In this embodiment, if any of these checks fails, then license manager 107 does not verify authorization to use the IP module. The license manager 107 denies the user 108 access to the IP module design information 118. In one example, IP module design information 118 has been loaded into the capture/design tool 106 but is present in encrypted form. The IP module design information 118 may, for example, have been publicly available on the World Wide Web in its encrypted form and may have been downloaded by user 108 and loaded into development system 104 for intended future use. When authorization to use the IP module is not verified, the license manager 107 does not decrypt the IP module design information 118. The capture/design tool 106 is therefore unable to use the IP module design information 118 and the user 108 is unable to use the IP module design information 118 in the user-specific circuit.

If, on the other hand, the license manager 107 succeeds in checking all these conditions, then license manager 107 verifies authorization to use the IP module and allows (step 205) user 108 access to the IP module design information 118 via the capture/design tool 106. License manager 107 uses the IP module key 120 from the authorization code 115 and an encryptor/decryptor 119 to decrypt the encrypted IP module design information 0.118. Once decrypted, the IP module design information 118 is accessible to user 108 via capture/design tool 106. User 108 can then design the IP module 301 into the user-specific circuit.

The IP module key 120 has a key number. In the example of FIG. 2, key 120 associated with IP module design information 118 and IP module 301 is key number one. Other such keys 121–123 associated with IP modules 302–303 and user's circuitry 304 are also shown in FIG. 2 and are key numbers two, three and four, respectively. The keys 121–122, like key 120, are keys for IP modules and therefore would have been received by license manager 107 via authorization codes. Key 123, on the other hand, is a key for user's circuitry 304. Key 123 is not received via an authorization code but rather is supplied to the license manager 107 by user 108.

In addition to decrypting the IP module design information 118, license manager 107 retrieves (step 205) the key 120 for IP module design information 118, encrypts key 120 and its key number using the UDI 116 (as a public key) and the private key 117, and then sends to FPGA 102 a key bitstream 125 involving the encrypted key 120 and its key number. This key bitstream 125 is received in FPGA 102, in one embodiment, via a JTAG boundary scan port terminal.

FPGA 102 uses its UDI 116 (a public key), private key 117, and an encryptor/decryptor 124 to decrypt (step 206) the encrypted key and key number. The FPGA 102 then stores the key 120 in association with the key number. In the illustrated example, key 120 is key number one and is written into the first location of a one-time writable ROM that holds UDI 116 and private key 117. Unlike UDI 116, IP module keys 120–123 and private key 117 are not readable from outside FPGA 102 but rather are only readable by encryptor/decryptor 124. Private key 117 is written into the FPGA by the FPGA manufacturer at the end of FPGA manufacturing. Private key 117 is not known to the IP vendor 113 nor to user 108 and never passes between FPGA 102 and development system 104. The same private key 117 is used by: 1) all FPGAS manufactured by a particular FPGA manufacturer, 2) the development systems used to program those FPGAs, and 3) the authorization code generating software that is used to supply authorization codes to the development systems.

Similar steps are carried out to obtain authorization codes and keys for the other IP modules 302 and 303 of the user-specific circuit. If IP module design information for another IP module is provided by a different IP vendor, then user 108 arranges with that IP vendor to receive a proper authorization code to access that particular IP module. Accordingly, each IP vendor can apply its own licensing restrictions on its own IP module design information. In the example of FIG. 2, keys 121 and 122 are the keys for IP modules 302 and 303 (FIG. 3), respectively.

When the user 108 has completed the design of the user-specific circuit employing IP module design information for IP modules 301–303, the capture/design tool 106 outputs a bitstream (step 207) for the composite user-specific circuit. Before the portion of the bitstream carrying the configuration data for a particular IP module, the license manager 107 inserts a start code and then the key number of the key for that IP module. The license manager 107 uses encryptor/decryptor 119 to encrypt the associated configuration data using the key indicated by the preceding key number.

Figure 6:
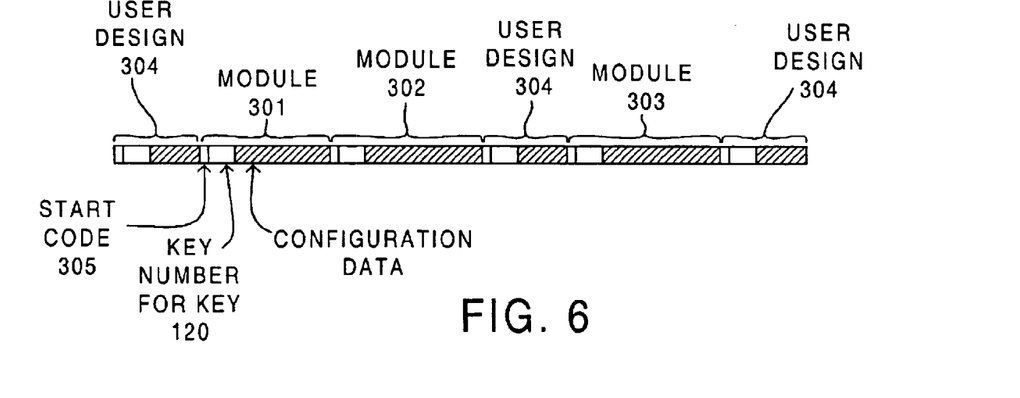
FIG. 6 is a simplified diagram of the configuration bitstream that configures the PLD of FIG. 2.

FIG. 6 is a simplified diagram of bitstream 101. Note that the portion of the bitstream associated with IP module 301 involves a start code 305, the key number for key 120, and configuration data that is encrypted with key 120. In the example of FIG. 6, each of the portions of the bitstream for IP modules 301–303 is a contiguous block. This need not be the case. Note that the configuration data for the user's portion of the circuit 304 is split into three parts. Each of the parts has a start code, the key number of the user key (key 123) used to encrypt the configuration data, and a part of the configuration data. Splitting up of the configuration data in this way is facilitated by the fact that the configuration data includes address information identifying memory cells on FPGA 102 as well as data that is to be written into those identified memory cells. The bit stream 101 is sent (step 208) to a serial data input (DIN) terminal of FPGA 102.

Next, FPGA 102 receives the bitstream 101 via the FPGA's DIN terminal and then uses encryptor/decryptor 124 to decrypt (step 209) each encrypted part with its respective key. For example, when FPGA 102 receives the part of the bitstream 101 corresponding to IP module 301, it receives the start code 305 and then the key number for key 120. This key number is "one". FPGA 102 uses this key number "one" to retrieve the key 120 stored in association with key number "one" in the one-time writable non-volatile ROM. Key 120 is supplied to encryptor/decryptor 124 to decrypt the following configuration data for IP module 301. In this way, the encrypted configuration data for each IP module is decrypted using the correct key identified by the preceding key number in the bitstream. The configuration data from the resulting decrypted bit stream 126 is loaded (step 209) into appropriate memory cells of the CLBS 4, IOBs 6, and configurable interconnect structure 5 so as to configure FPGA 102 to realize the user-specific circuit. Because FPGA 102 in this example is a Virtex family Xilinx FPGA, the resulting decrypted bitstream 126 comports with the standard Xilinx bit stream protocol for configuring a Virtex family FPGA. If, on the other hand, the PLD being configured is not a Xilinx Virtex FPGA and therefore requires a different configuration bitstream, then decrypted bitstream 126 would comport with the protocol required by that PLD.

Various encryption methods and structures are known and available for use in implementing system 100. In one embodiment, encryptor/decryptor 119 and encryptor/decryptor 124 are DES (Data Encryption Standard) encryptor/decryptors. Encryptor/decryptor 119 is, for example, realized in software whereas encryptor/decryptor 124 is realized in hardware. The DES algorithm has been a nationwide standard since about 1976. For additional information and implementation considerations involved in realizing DES encryptors and decryptors in software and hardware, see: 1) Applied Cryptography, second edition, by Bruce Schneier, Chapter 12: Data Encryption Standard (DES), pages 265–301 (1996); 2) U.S. Pat. Nos. 5,671,284 and 5,835,599 to Buer; and 3) U.S. Pat. No. 4,731,843 to Holmquist (the content of these documents is incorporated herein by reference).

It is desired that one user not be able to understand or copy the design of another user by copying the bit stream loaded into the FPGA on power-up. In the above-described embodiment, the user provides key "KEY 4" 123 and this key is used to encrypt the portions of the bitstream associated with user's portion 304 of the user-specific circuit. A second user cannot therefore decipher the first user's design by examining the bitstream. The second user cannot copy the bitstream and program other FPGAs, even if the second user were to arrange with the necessary IP vendors to use the needed IP modules, because the second user would not know "KEY 4" of the first user. Because each FPGA programmed must first be loaded with the set of keys from the license manager, and because the bitstream by which these keys is loaded is not the same FPGA to FPGA, copying the bitstream by which the keys are loaded into one FPGA would not enable the second user to load the keys into another FPGA.

It is also desired that a user not be able to understand or copy the IP module design from an IP vendor. In the above-described embodiment, the portion of the configuration bitstream 101 corresponding to an IP module is encrypted with a key that is never known by the user. The user cannot therefore decrypt the IP module. The user cannot steal the key by monitoring the transfer of keys to the FPGA because the keys are encrypted using the UDI (a public key) and a private key not known to the user.

It is also desired that the configuration bitstream 101 itself (as opposed to the bitstream 125 by which the keys are loaded) be identical for all FPGAs of a given user-specific design. This facilitates rapid programming of the user-specific circuit design into multiple FPGAs at the same time. In the above-described embodiment, bitstream 101 is the same for all FPGAS programmed with the same user-specific circuit. Key bitstream 125 by which the keys are loaded changes from FPGA to FPGA, but the configuration data bitstream 101 remains the same.

Care is also taken to ensure that a user cannot arrange with an IP vendor to use an IP module for a limited time or a limited number of usages, gain access to the IP module in an authorized manner for example via capture/design tool 106, but then examine the internal design of the IP module via the capture/design tool, copy the design, and use the copied design again outside the control of the IP vendor.

In the capture/design tool 106, a representation of the user-specific circuit complete with the IP modules 301–303 exists in a netlist form. Ordinarily a user has been able to view a net in any portion of the user-specific circuit. The user could, for example, select a net and then view in graphical form all circuit elements to which it is connected. Doing this for all nets in a circuit reveals the circuit. The user could ordinarily view any net in the user-specific circuit at the logic netlist stage, or after place and route and the logic-optimized netlist stage. In accordance with one embodiment of the present invention, each net of the user-specific circuit carries a "visible/invisible" attribute. All nets inside an IP module carry the "invisible" attribute. If the user were to attempt to use the capture/design tool to view a net inside an IP module in an attempt to redraw the circuitry, the capture/design tool 106 would detect the "invisible" attribute of the net and not allow the user to examine the net. Nets outside the IP modules, on the other hand, carry the "visible" attribute and are visible to the user via the capture/design tool 106. The "invisible" attribute on a net would also prevent the user from viewing signals on the net during simulation.

Because the keys are written into each respective FPGA using a unique UDI that is first read from the particular FPGA being programmed, the license manager 107 is able to control which particular FPGAs are programmed. This, in combination with an authorization code that is specific to a particular target FPGA, allows an individual IP vendor to employ "use-based" licensing of an IP module.

An IP vendor may also employ "time-based" licensing of an IP module. In one embodiment, IP vendor 113 gives user 108 an authorization code 115 to use an IP module for a certain period of time or up until a certain expiration date. IP vendor 113 loads the time period or expiration date into license manager 107. Once the licensing manager determines (for example, using a clock internal to the license manager) that the authorized time period has expired or the expiration data has passed, the licensing manager 107 no longer verifies that authorization 115 authorizes usage of the IP module.

It is therefore seen that a single FPGA can involve multiple IP modules, where each IP module is licensed by a different IP vendor using a different license and business arrangement without the intervention of the FPGA manufacturer. The direct interaction between IP vendors and users is generally advantageous from the FPGA manufacturer's point of view, because it eliminates the need for the FPGA manufacturer to act as a royalty collector on behalf of IP vendors. Moreover, the ability of an end user to program FPGAs with selected IP modules without being able to steal the IP module design eliminates the need for the FPGA manufacturer or the IP vendor to inventory FPGAs partially programmed with individual IP modules.

In the example of FIG. 4 the user cannot design an IP module into the user-specific design before a suitable license arrangement has been made because authorization code 115 is required in order for the capture/design tool 106 to access the IP module design information 118. This need not, however, be the case. In one embodiment, the capture/design tool 106 decrypts the IP module design information 118 and allows the user access to the IP module design information 118 thereby allowing the user to design the IP module into a user-specific design without any authorization code. The user cannot view nets within the IP module or view simulation signals inside the IP module. The IP module therefore appears as a black box and is fairly secure from being reverse-engineered by the user. Only at the point that the user-specific design is ready for downloading to FPGA 102 as bitstream 101 does the user have to obtain the appropriate IP module licenses. When the user attempts to create configuration bitstream 101, the license manager reads the UDI 116 from FPGA 102 and asks the user for authorization code 115. If, as in the method of FIG. 4, the user provides an appropriate authorization code (that, among other things, contains the UDI 116 read from target FPGA 102), then the license manager 107 sends key bitstream 125 to the target FPGA 102 and allows the encrypted configuration bitstream 101 to be generated.

Figure 7:
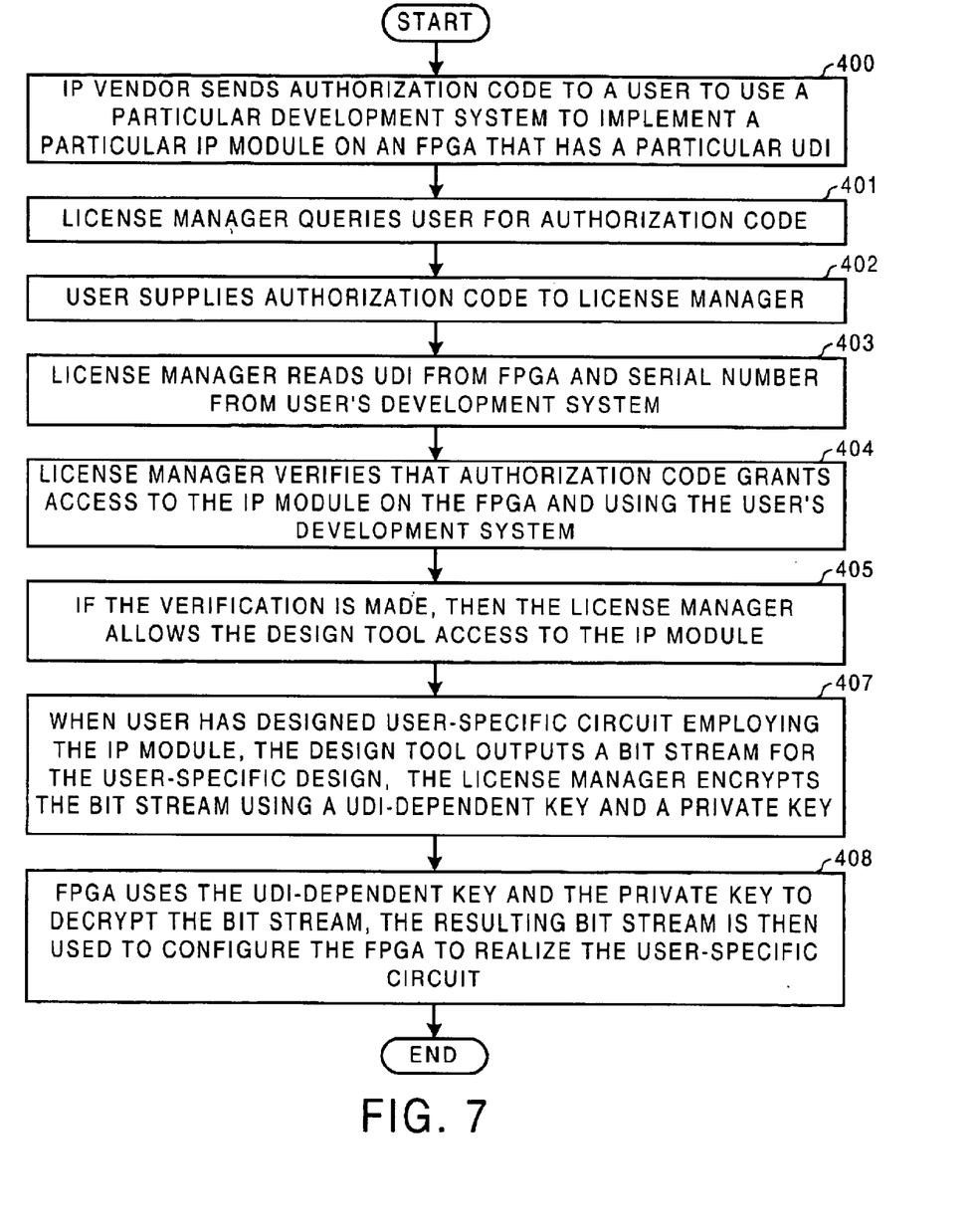
FIG. 7 is a flowchart of another method carried out by the system 100 of FIG. 2.

FIG. 7 is a flowchart of another method carried out by system 100 of FIG. 2. In this method, a different configuration bitstream is generated for each different PLD to be configured even if the same user-specific circuit is being programmed into each PLD. Steps 400–404 of the method of FIG. 7 are the same as steps 200–204 of the method of FIG. 4. In step 405, the license manager 107 allows access to the IP module, but does not encrypt a key and key number and does not send them to the PLD 102 being programmed. PLD 102 therefore does not decrypt keys and key numbers, nor does PLD 102 store any such decrypted keys. When the user has designed the user-specific circuit employing the IP module, a configuration bitstream is output (Step 407) by capture/design tool 106. No key numbers are inserted into the bitstream as in step 207 of FIG. 4, rather the entire configuration bitstream is encrypted using a UDI-dependent key and private key 117. The UDI-dependent key is, on one embodiment, UDI 116 as read from PLD 102. UDI 116 is, however, also stored on PLD 102. PLD 102 uses the UDI-dependent key along with private key 117 to decrypt (Step 408) the incoming encrypted configuration bitstream 101 and then configures PLD 102 using the resulting bitstream so as to realize the user-specific circuit. Because the incoming encrypted configuration bitstream 101 is encrypted using a key that depends on the UDI 116 of the particular target PLD 102, target PLD 102 is the only PLD that can decrypt and use this configuration bitstream.

FPGA 102 implements a read-back mechanism usable to read out the bitstream and/or to examine internal states of the FPGA. In one embodiment, a read back bitstream passes out of FPGA 102 via encryptor/decryptor 124 (see FIG. 5). A readback key known to license manager 107 (for example, a UDI-dependent key that is derived in a particular way from UDI 116) is used to encrypt the read-back bitstream. This readback key may be, for example, generated from UDI 116 via hardware and as such is not stored in non-volatile memory on FPGA 102.

The license manager 107, having previously read UDI 116, also knows how the readback key is generated from UDI 116. The license manager 107 is therefore able to obtain the readback key and to use the readback key along with encryptor-decryptor 119 to decrypt the read-back bitstream. License manager 107 controls capture/design tool 106 so that the user can only examine those portions of the readback data and states that do not reveal the inner workings of secure IP modules. This gives the user access to information about the portions of the user-specific design that the user controls, while protecting the secure IP modules from reverse-engineering attempts.

A commercially-available general purpose license management system involving a license manager and authorization code generating software may be adapted to serve as license manager 107 and authorization code generating software 103. For example, the Flexible License Manager (FLEXlm) (also called the "Highland License Manager") available from GLOBEtrotter Software, Inc. of Cupertino, Calif. may be employed. The UDI, development system serial number, and/or other information in the authorization code is not, in some embodiments, encrypted. Rather, it is present in the authorization code in unencrypted form but is combined with a specially generated Message Authentication Code (MAC). The MAC is a complex checksum produced from the rest of the authorization code in a way not known to the user. Because the user is not aware of how the checksum was produced, the user is unable to generate his/her own valid authorization codes.

Although the present invention is described in connection with certain specific embodiments for instructional purposes, the present invention is not limited thereto. The disclosed embodiments are applicable to one-time programmable PLDs and FPGAs (including antifuse- or oxide-rupture-based, fuse-based, and laser-programmed PLDs and FPGAS), to non-volatile PLDs and FPGAS (including EPROM-based and flash-based PLDS and FPGAS), as well as to RAM-based PLDs and FPGAs. The license manager may read the UDI from the PLD to be programmed and then receive the authorization code from the user, or alternatively may read the UDI from the PLD to be programmed after receiving the authorization code from the user. In some embodiments, a user can use the capture/design tools to design an IP module into the user-specific circuit without having supplied a suitable authorization code, the license manager only requiring a proper authorization code if a final output configuration bitstream is to be generated. IP module keys can be transferred from the license manager to the target PLD without the use of a public key/private key encryption scheme. Other ways of protecting the IP module keys from unauthorized use can be used. In one embodiment, the IP module keys are encrypted just with the UDI and then are transferred to the target PLD. The authorization code need not contain a serial number or ID number or dongle number identifying the user's development system. In some embodiments, an authorization code grants access to an IP module on any development system, provided that the usage conditions indicated by the authorization code are met. Accordingly, various modifications, adaptations, and combinations of various features of the described embodiments can be practiced without departing from the scope of the invention as set forth in the claims.

What is claimed is:

1. A method, comprising:
   (a) maintaining a device identifier and a private key in a programmable logic device, the device identifier and the private key being non-volatile such that if power to the programmable logic device is lost the device identifier and private key remain stored in the programmable logic device;
   (b) receiving a first encrypted key onto the programmable logic device, and using the device Identifier and the private key to decrypt the first encrypted key thereby generating a first key;
   (c) receiving onto the programmable logic device a bitstream comprising first encrypted configuration data encrypted with the first key;
   (d) using the first key to decrypt the first encrypted configuration data on the programmable logic device thereby generating first configuration data; and
   (e) configuring a first portion of the programmable logic device using the first configuration data.

2. The method of claim 1, wherein neither the device identifier nor the private key are rewritable.

3. The method of claim 1, wherein the bitstream further comprises a first key number associated with the first encrypted configuration data, the first key being stored on the programmable logic device in association with the first key number, the programmable logic device in step (d) using the first key number in the bitstream to identify the first key as the key that will be used in step (d) to decrypt the first encrypted configuration data.

4. The method of claim 1, wherein the device identifier and the private key are stored on the programmable logic device in one of the group consisting of: an antifuse-based storage element, a fuse-based storage element, a laser-programmed storage element, an EPROM storage element, and a flash-based storage element.

5. The method of claim 1, further comprising:
   after the first key is generated in step (b), storing the first key in non-volatile memory on the programmable logic device.

6. The method of claim 1, wherein the first encrypted configuration data is decrypted in step (d) on the programmable logic device by a hardware decryptor.

7. The method of claim 1, wherein the programmable logic device is an SRAM-based PLD.

8. The method of claim 1, wherein the device identifier and the private key are rewritable at one time, but as of the time step (a) occurs are no longer rewritable.

9. The method of claim 1 wherein
   step (b) further comprises receiving a second encrypted key onto the programmable logic device and using the device identifier and the private key to decrypt the second encrypted key, thereby generating a second key;
   step (c) further comprises receiving onto the programmable logic device a bitstream comprising second encrypted configuration data encrypted with the second key;
   step (d) further comprises using the second key to decrypt the second encrypted configuration data on the programmable logic device, thereby generating second configuration data; and
   step (e) further comprises configuring a second portion of the programmable logic device using the second configuration data.

10. The method of claim 9, wherein the bitstream further comprises a first key number associated with the first encrypted configuration data, and wherein the bitstream further comprises a second key number associated with the second encrypted configuration data, the first key being stored on the programmable logic device in association with the first key number, the second key being stored on the programmable logic device in association with the second key number, the programmable logic device in (d) using the first key number in the bitstream to identify the first key as the key that will be used in (d) to decrypt the first encrypted configuration data, the programmable logic device in (d) using the second key number in the bitstream to identify the second key as the key that will be used in (d) to decrypt the second configuration data.

11. The method of claim 9 further comprising:
   after the first key and the second key are generated in step (b), storing the first key and the second key in non-volatile memory on the programmable logic device.

12. The method of claim 9, wherein the first portion of the programmable logic device is configured in (e) to realize a first IP module, and wherein the second portion of the programmable logic device is configured in (e) to realize a second IP module.

13. The method of claim 12, wherein the non-volatile memory in the programmable logic device is flash-based.

14. The method of claim 12, wherein the non-volatile memory in the programmable logic device is one-time programmable.

15. The method of claim 12, wherein the non-volatile memory in the programmable logic device is antifuse-based.

16. The method of claim 12, wherein the non-volatile memory in the programmable logic device is fuse-based.

17. The method of claim 1, further comprising:
   receiving on a license manager the device identifier maintained on the programmable logic device;
   receiving on the license manager a first authorization code; and determining whether the first authorization code has a predetermined relationship with respect to the device identifier, wherein if the first authorization code is determined to have the predetermined relationship then the license manager sends the first encrypted key to the programmable logic device such that it is received in step (b), and wherein if the first authorization code is determined not to have the predetermined relationship then the license manager does not send the first encrypted key to the programmable logic device in step (b).

18. The method of claim 17, wherein the first authorization code has the predetermined relationship with respect to the device identifier if the first authorization code contains the device identifier in an encrypted form.

19. A method comprising:

receiving onto a programmable logic device an encrypted first key;

on the programmable logic device decrypting the encrypted first key to generate a first key and storing the first key on the programmable logic device;

receiving onto the programmable logic device a configuration bitstream having a first portion and a second portion;

on the programmable logic device decrypting the first portion of the configuration bitstream using the first key; and configuring the programmable logic device with the decrypted first portion of the configuration bitstream thereby realizing a first IP module.

20. The method of claim 19, further comprising:

receiving onto the programmable logic device an encrypted second key;

on the programmable logic device decrypting the encrypted second key to generate a second key and storing the second key on the programmable logic device;

on the programmable logic device decrypting the second portion of the configuration bitstream using the second key; and configuring the programmable logic device with the decrypted second portion of the configuration bitstream thereby realizing a second IP module.

21. A method, comprising:

receiving on a development system a device identifier from a programmable logic device;

receiving on the development system an authorization code;

verifying on the development system that the authorization code and the device identifier have a predetermined relationship, wherein if the authorization code and the device identifier have the predetermined relationship then encrypting a key using the device identifier and sending the encrypted key from the development system to the programmable logic device, but wherein if the authorization code and the device identifier do not have the predetermined relationship then the encrypted key is not sent from the development system to the programmable logic device; and the development system using the key to encrypt a portion of a configuration data bitstream, the development system outputting the configuration data bitstream including the encrypted portion.

22. The method of claim 21, wherein the key has a key number, and wherein the development system adds the key number to the configuration data bitstream such that the key number is associated with the encrypted portion of the configuration data bitstream, the configuration data bitstream output from the development system including the encrypted portion and the key number.

23. The method of claim 21, wherein the development system comprises a capture/design tool and a license manager, the method further comprising:

if the authorization code and the device identifier are verified as having the predetermined relationship then the license manager allows use of IP module design information by the capture/design tool, whereas if the authorization code and the device identifier are not verified as having the predetermined relationship then the license manager does not allow use of the IP module design information by the capture/design tool.

24. The method of claim 21, wherein the portion of the configuration data bitstream is configuration data for an IP module, the development system comprising a capture/design tool, the capture/design tool being usable to view a net external to the IP module, the capture/design tool not being usable to view a net internal to the IP module.

25. A development system, comprising:

a capture/design tool; and means for verifying that an authorization code has a predetermined relationship with respect to a device identifier read from a programmable logic device, and if the authorization code is verified then the means also encrypting a key and sending the encrypted key to the programmable logic device, if the authorization code is verified then the means also uses the key to encrypt a portion of a configuration data bitstream output by the capture/design tool, the configuration data bitstream including the encrypted portion being sent to the programmable logic device.

26. The development system of claim 25, wherein the encrypted portion of the bitstream contains configuration data for an IP module, the capture/design tool being usable to view a net external to the IP module, the capture/design tool being unusable to view a net internal to the IP module.

27. The development system of claim 25, wherein the key has a key number, the means inserting the key number into the configuration data bitstream sent to the programmable logic device, the key number in the configuration data bitstream being associated with the encrypted portion of the configuration data bitstream.

* * * * *